(12) United States Patent
Moseley (10) Patent No.: US 10,705,667 B2
(45) Date of Patent: Jul. 7, 2020

(54) PHASE SHIFT AND PHASE SHIFT ASSISTED SENSING

(71) Applicant: Tactual Labs Co., New York, NY (US)

(72) Inventor: Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 81 days.

(21) Appl. No.: 15/905,465

(22) Filed: Feb. 26, 2018

(65) Prior Publication Data
US 2019/0042032 A1    Feb. 7, 2019

Related U.S. Application Data

(60) Provisional application No. 62/540,458, filed on Aug. 2, 2017, provisional application No. 62/572,005, filed on Oct. 13, 2017.

(51) Int. Cl.
| | |
|---|---|
| *G06F 3/041* | (2006.01) |
| *G06F 3/046* | (2006.01) |
| *G06F 3/044* | (2006.01) |
| *H01Q 21/06* | (2006.01) |
| *H01Q 21/28* | (2006.01) |
| *H01Q 3/40* | (2006.01) |
| *H01Q 21/08* | (2006.01) |

(52) U.S. Cl.
CPC .............. *G06F 3/046* (2013.01); *G06F 3/044* (2013.01); *G06F 3/0416* (2013.01); *H01Q 3/40* (2013.01); *H01Q 21/061* (2013.01); *H01Q 21/08* (2013.01); *H01Q 21/28* (2013.01)

(58) Field of Classification Search
CPC ...... G06F 3/044; G06F 3/0416; G06F 3/0418; G06F 3/0436; G06F 3/041; G06F 3/046; G06F 3/043; G06F 3/0412; G06F 2203/04104; G06F 2203/04108; G06F 3/04

See application file for complete search history.

(56) References Cited

U.S. PATENT DOCUMENTS

| | | | | |
|---|---|---|---|---|
| 2007/0062852 | A1* | 3/2007 | Zachut | A63F 3/00643 209/683 |
| 2010/0321315 | A1* | 12/2010 | Oda | G06F 3/044 345/173 |
| 2014/0267140 | A1* | 9/2014 | Leigh | G06F 3/044 345/174 |

* cited by examiner

*Primary Examiner* — Xuemei Zheng
(74) *Attorney, Agent, or Firm* — Adam B. Landa (57) ABSTRACT

Disclosed is a phase measurement system and method. Multiple frequency orthogonal signals are transmitted simultaneously along the same row conductor. One of the signals may be low frequency signal. The other signal may be a high frequency signal. The field of the low frequency signal may extend further above a touch surface than the high frequency signal. The phase data from the low frequency signal may be used to provide information about a touch event.

16 Claims, 5 Drawing Sheets

PHASE SHIFT AND PHASE SHIFT ASSISTED SENSING

This is a non-provisional patent application and claims the benefit of U.S. Provisional Patent Application Ser. No. 62/540,458, entitled "Noise Mitigation for Frequency Domain Sensor," filed Aug. 2, 2017; and U.S. Provisional Patent Application Ser. No. 62/572,005, entitled "High Proximity Minimal Transmit Sensor Driver," filed Oct. 13, 2017, the contents of all the aforementioned applications hereby incorporated herein by reference.

FIELD

The disclosed systems relate in general to the field of user input, and in particular to devices sensitive to touch, including, hover and pressure.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

This application relates to user interfaces such as found in U.S. patent application Ser. No. 15/195,695, entitled "Frame-Phase Synchronization in Frequency Division Modulated Touch Systems." The entire disclosure of that application, and the applications incorporated therein by reference, are incorporated herein by reference. Familiarity with the concepts and terms therein is presumed.

An embodiment of the disclosure is an apparatus having a plurality of antenna mounted on a substrate. The apparatus has signal generator conductively connected to each of at least a first group of the plurality of antenna, the signal generator is adapted to generate a plurality of distinct signals during a plurality of sequential integration periods. The apparatus has a signal receiver conductively connected to each of at least a second group of the plurality of antennas, the signal receiver adapted to take a sequence of digital samples of signals on each of at least a second antenna group during the plurality of sequential integration periods. The apparatus has a signal processing system operatively connected to the signal receiver, the signal processing system being adapted to; perform a discrete Fourier transform on each sequence of digital samples taken during each of the plurality of sequential integration periods; determine a phase angle corresponding to each of the plurality of distinct signals in each sequence of digital samples for each of the plurality of sequential integration periods; and utilize the phase angle of at least one of the plurality of distinct signals to identify a touch event.

An embodiment of the disclosure is a method having the steps of generating a plurality of distinct signals on at least a first group of a plurality of antenna during a plurality of sequential integration periods; taking a sequence of digital samples of signals received on each of at least a second antenna group of the plurality of antennas during the plurality of sequential integration periods; performing a discrete Fourier transform on each sequence of digital samples taken during each of the plurality of sequential integration periods; determining a phase angle corresponding to each of the plurality of distinct signals in each sequence of digital samples for each of the plurality of sequential integration periods; and utilizing the phase angle of at least one of the plurality of distinct signals to identify a touch event.

In various embodiments, the present disclosure is directed to systems (e.g., objects, panels or keyboards) sensitive to hover, contact and pressure and their applications in real-world, artificial reality, virtual reality and augmented reality settings. It will be understood by one of ordinary skill in the art that the disclosures herein apply generally to all types of systems using fast multi-touch to detect hover, contact an pressure. In an embodiment, the present system and method can be applied to keyboards, including but not limited to membrane keyboards, dome-switch keyboards, scissor-switch keyboards, capacitive keyboards, mechanical-switch keyboards, buckling-spring keyboards, hall-effect keyboards, laser projection keyboard, roll-up keyboards, and optical keyboard technology.

Throughout this disclosure, the terms "touch", "touches", "contact", "contacts", "hover", or "hovers" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which being a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods provide for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." These applications contemplate FDM, CDM, or FDM/CDM hybrid touch sensors which may be used in connection with the presently disclosed sensors. In such sensors, touches are sensed when a signal from a row is coupled (increased) or decoupled (decreased) to a column and the result received on that column.

This application employs principles used in fast multi-touch sensors and other interfaces disclosed in the following U.S. Pat. Nos. 9,019,224 B2, 9,811,214 B2, 9,804,721 B2, 9,710,113 B2, 9,158,411 B2, and the following U.S. patent application Ser. Nos. 14/466,624, 15/162,240, 15/690,234, 15/195,675, 15/200,642, 15/821,677, 62/540,458, 62/575, 005, 62/619,656 and PCT publication PCT/US2017/050547, familiarity with the disclosure, concepts and nomenclature therein is presumed. The entire disclosure of those application and the applications incorporated therein by reference are incorporated herein by reference. Details of the presently disclosed system and method for performing phase measure are then described further below under the heading "Phase Measurement."

As used herein, the phrase "touch event" and the word "touch" when used as a noun include a near touch and a near touch event, or any other gesture that can be identified using a sensor. In accordance with an embodiment, touch events may be detected, processed and supplied to downstream computational processes with very low latency, e.g., on the order of ten milliseconds or less, or on the order of less than one millisecond.

In an embodiment, a fast multi-touch sensor utilizes a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to, e.g., the optical sensor, such embodiments utilize photon tunneling and leaking to sense a touch event, and a "capacitive object" as used herein includes any object, such as a stylus or finger, that that is compatible with such sensing. Similarly, "touch locations" and "touch sensitive device" as used herein do not require actual touching contact between a capacitive object and the disclosed sensor.

Figure 1:
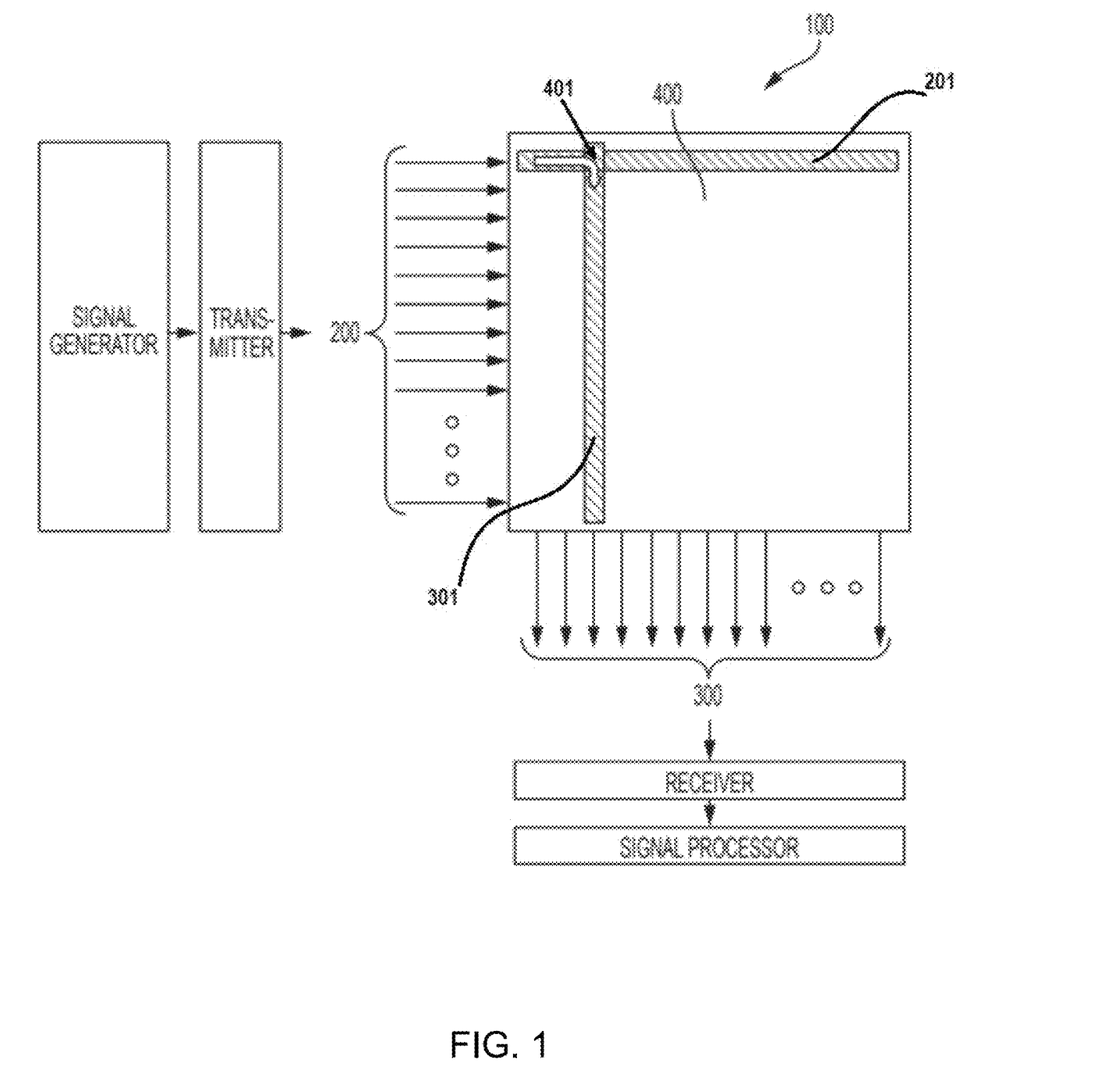
FIG. 1 is a high level block diagram illustrating an embodiment of a low-latency touch sensor device.

FIG. 1 illustrates certain principles of a fast multi-touch sensor 100 in accordance with an embodiment. At reference no. 200, a different signal is transmitted into each of the surface's rows. The signals are designed to be "orthogonal", i.e., separable and distinguishable from each other. At reference no. 300, a receiver is attached to each column. The receiver is designed to receive any of the transmitted signals, or an arbitrary combination of them, with or without other signals and/or noise, and to individually determine a measure, e.g., a quantity for each of the orthogonal transmitted signals present on that column. The touch surface 400 of the sensor comprises a series of rows and columns (not all shown), along which the orthogonal signals can propagate. In an embodiment, the rows and columns are designed so that, when they are not subject to a touch event, a lower or negligible amount of signal is coupled between them, whereas, when they are subject to a touch event, a higher or non-negligible amount of signal is coupled between them. In an embodiment, the opposite could hold—having the lesser amount of signal represent a touch event, and the greater amount of signal represent a lack of touch. Because the touch sensor ultimately detects touch due to a change in the coupling, it is not of specific importance, except for reasons that may otherwise be apparent to a particular embodiment, whether the touch-related coupling causes an increase in amount of row signal present on the column or a decrease in the amount of row signal present on the column. As discussed above, the touch, or touch event does not require a physical touching, but rather an event that affects the level of coupled signal.

With continued reference to FIG. 1, in an embodiment, generally, the capacitive result of a touch event in the proximity of both a row and column may cause a non-negligible change in the amount of signal present on the row to be coupled to the column. More generally, touch events cause, and thus correspond to, the received signals on the columns. Because the signals on the rows are orthogonal, multiple row signals can be coupled to a column and distinguished by the receiver. Likewise, the signals on each row can be coupled to multiple columns. For each column coupled to a given row (and regardless of whether the coupling causes an increase or decrease in the row signal to be present on the column), the signals found on the column contain information that will indicate which rows are being touched simultaneously with that column. The quantity of each signal received is generally related to the amount of coupling between the column and the row carrying the corresponding signal, and thus, may indicate a distance of the touching object to the surface, an area of the surface covered by the touch and/or the pressure of the touch.

When a row and column are touched simultaneously, some of the signal that is present on the row is coupled into the corresponding column (the coupling may cause an increase or decrease of the row signal on the column). (As discussed above, the term touch or touched does not require actual physical contact, but rather, relative proximity.) Indeed, in various implementations of a touch device, physical contact with the rows and/or columns is unlikely as there may be a protective barrier between the rows and/or columns and the finger or other object of touch. Moreover, generally, the rows and columns themselves are not in touch with each other, but rather, placed in a proximity that allows an amount of signal to be coupled there-between, and that amount changes (positively or negatively) with touch. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.

The nature of the rows and columns is arbitrary and the particular orientation is irrelevant. Indeed, the terms row and column are not intended to refer to a square grid, but rather to a set of conductors upon which signal is transmitted (rows) and a set of conductors onto which signal may be coupled (columns). (The notion that signals are transmitted on rows and received on columns itself is arbitrary, and signals could as easily be transmitted on conductors arbitrarily designated columns and received on conductors arbitrarily named rows, or both could arbitrarily be named something else.) Further, it is not necessary that the rows and columns be in a grid. Other shapes are possible as long as a touch event will touch part of a "row" and part of a "column", and cause some form of coupling. For example, the "rows" could be in concentric circles and the "columns" could be spokes radiating out from the center. And neither the "rows" nor the "columns" need to follow any geometric or spatial pattern, thus, for example, the keys on keyboard could be arbitrarily connected to form rows and columns (related or unrelated to their relative positions.) Moreover, it is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna conductors may be used rather than just "rows" and "columns." Many alternative embodiments are possible and will be apparent to a person of skill in the art after considering this disclosure.

As noted above, in an embodiment the touch surface 400 comprises a series of rows and columns, along which signals can propagate. As discussed above, the rows and columns are designed so that, when they are not being touched, one amount of signal is coupled between them, and when they are being touched, another amount of signal is coupled between them. The change in signal coupled between them may be generally proportional or inversely proportional (although not necessarily linearly proportional) to the touch such that touch is less of a yes-no question, and more of a gradation, permitting distinction between more touch (i.e., closer or firmer) and less touch (i.e., farther or softer)—and even no touch. Moreover, a different signal is transmitted into each of the rows. In an embodiment, each of these different signals are orthogonal (i.e., separable and distinguishable) from one another. When a row and column are touched simultaneously, signal that is present on the row is coupled (positively or negatively), causing more or less to appear in the corresponding column. The quantity of the signal that is coupled onto a column may be related to the proximity, pressure or area of touch.

At reference 300 receiver is attached to each column. The receiver is designed to receive the signals present on the columns, including any of the orthogonal signals, or an arbitrary combination of the orthogonal signals, and any noise or other signals present. Generally, the receiver is designed to receive a frame of signals present on the columns, and to identify the columns providing signal. In an embodiment, the receiver (or a signal processor associated with the receiver data) may determine a measure associated with the quantity of each of the orthogonal transmitted signals present on that column during the time the frame of signals was captured. In this manner, in addition to identifying the rows in touch with each column, the receiver can provide additional (e.g., qualitative) information concerning the touch. In general, touch events may correspond (or inversely correspond) to the received signals on the columns. For each column, the different signals received thereon indicate which of the corresponding rows is being touched simultaneously with that column. In an embodiment, the amount of coupling between the corresponding row and column may indicate e.g., the area of the surface covered by the touch, the pressure of the touch, etc. In an embodiment, a change in coupling over time between the corresponding row and column indicates a change in touch at the intersection of the two.

Figure 2:
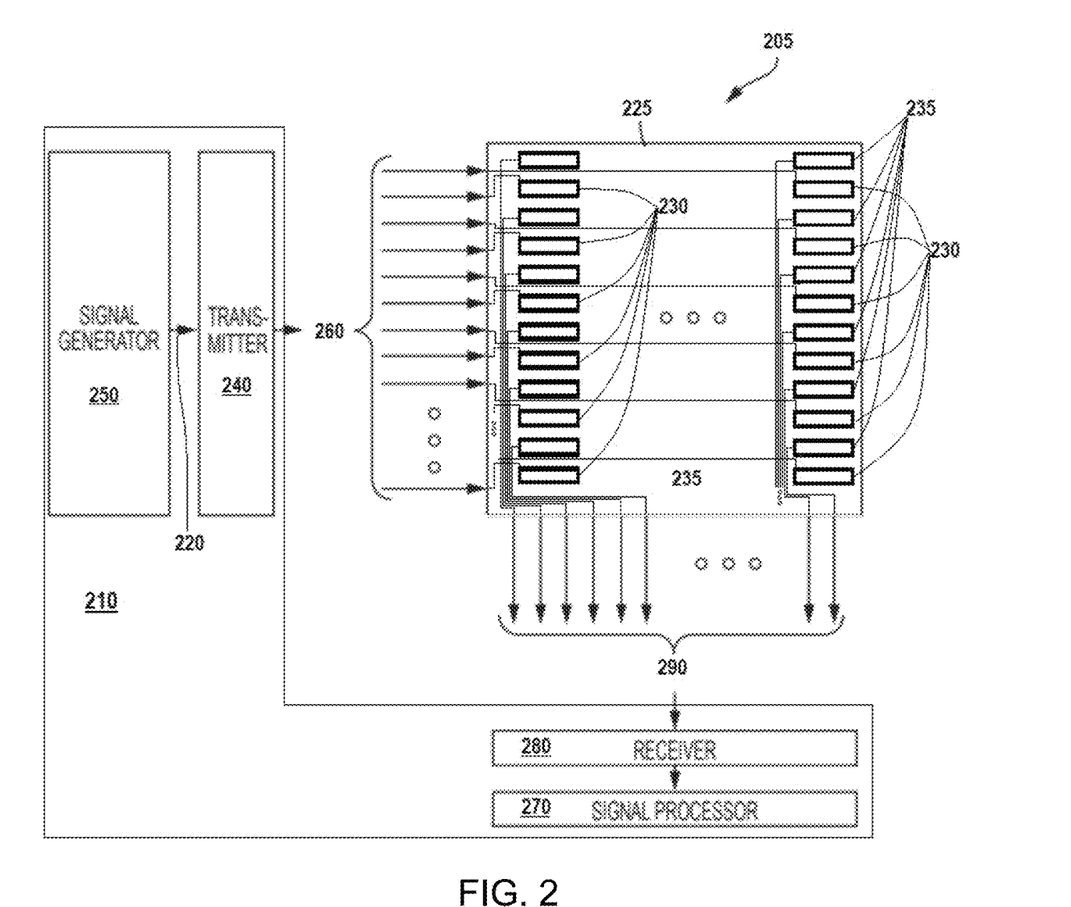
FIG. 2 is a high level block diagram illustrating another embodiment of a low-latency touch sensor device.

Turning to FIG. 2, a sensor 205 is shown. In an embodiment, sensor 205 comprises a plurality of antenna 230, 235 spaced apart from one-another on a substrate 225. While two rows of antennas 230, 235 are shown, as illustrated by the ellipses, in an embodiment, only one row is required, however two or more rows may be used. Similarly, while each row comprises 12 antennas, fewer or more antennas may be used in a row. In an embodiment, the antenna are each between 1 mm and 5 mm in height (as viewed on the page), and between 3 mm and 25 mm in width (as viewed on the page). In an embodiment, each antenna is 2×5 mm. In an embodiment, each antenna is 2×8 mm. In an embodiment, each antenna is 3×5 mm. In an embodiment, each antenna is 2×8 mm. In an embodiment, each antenna is 2×10 mm. In an embodiment, each antenna is 3×10 mm. In an embodiment, each antenna is 4×10 mm. It will be apparent to a person of skill in the art that the antenna can be sized and shaped as appropriate for the application.

The antennas are spaced from one-another. In an embodiment, each antenna is at least 1 mm away from every other antenna. In an embodiment, each antenna is at least 2 mm away from every other antenna. In an embodiment, each antenna is at least 3 mm away from every other antenna. In an embodiment, each antenna is at least 4 mm away from every other antenna. In an embodiment, each antenna is at least 5 mm away from every other antenna. In an embodiment, the antenna spacing varies among antenna such that some antenna are closer together than others. It will be apparent to a person of skill in the art that the antenna can be spaced from one-another as appropriate for the application.

In an embodiment, antennas are distributed on a substrate for use with a keyboard. In an embodiment, antennas of 2×8 mm are spaced from one-another by 3 mm along their long dimension sides, and by 4 mm along the short dimension sides, and are laid out on a substrate 225 that is sufficient in size to be placed beneath the keys of a keyboard (i.e., about 15×40 mm). Although the antennas may be aligned with the keys of a keyboard, it is not necessary to align the antennas with the keys. In an embodiment (as illustrated), the antennas are not aligned with the keys of a keyboard. It will be apparent to a person of skill in the art that the antenna can be dimensioned and spaced from one-another as appropriate for another keyboard or for another application.

In an embodiment, the plurality of antenna 230, 235 which may be used as transmit antenna 230 and a plurality of receive antenna 235, although the designations of transmit and receive are arbitrary, and can be reversed by swapping the antenna's connecting from transmitter to receiver or vice versa. In an embodiment, a matrix switcher (not shown) could be used to dynamically reconfigure the connection of an antenna from a receiver to a transmitter. In an embodiment, an antenna can be connected to both a transmitter and receiver, which transmitter could be used simultaneously, or at different times.

In an embodiment, signal generator 250 and transmitter 240 are operatively connected to each of a plurality of transmit antennas 230 and configured to generate and transmit each of a plurality of frequency-orthogonal signals 260 to each of the plurality of transmit antenna 230. In an embodiment, a receiver 280 and signal processor 270 are associated with each receive antenna 325 and operatively connected thereto.

In an embodiment, a mixed signal integrated circuit 210 comprises signal generator 250, transmitter 240, receiver 280 and signal processor 270. In an embodiment, the mixed signal integrated circuit 210 is adapted to generate one or more signals and send the signals to transmit antennas 230. In an embodiment, the mixed signal integrated circuit 210 is adapted to generate a plurality of frequency-orthogonal signals 260 and send the plurality of frequency-orthogonal signals 260 to the transmit antenna 230. In an embodiment, the mixed signal integrated circuit 210 is adapted to generate a plurality of frequency-orthogonal signals 260 and send one or more of the plurality of frequency-orthogonal signals 260 to each of a plurality of transmit antenna 230. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor 270 of mixed signal integrated circuit 210 (or a downstream component or software) is adapted to determine at least one value representing each frequency orthogonal signal transmitted to a transmit antenna 230. In an embodiment, the signal processor 270 of mixed signal integrated circuit 210 (or a downstream component or software) performs a Fourier transform to received signals. In an embodiment, the mixed signal integrated circuit 210 is adapted to digitize received signals. In an embodiment, the mixed signal integrated circuit 210 (or a downstream component or software) is adapted to digitize received signals and perform a discrete Fourier transform (DFT) on the digitized information. In an embodiment, the mixed signal integrated circuit 210 (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at least 1 MHz. In an embodiment, received signals are sampled at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which could be an FFT) output comprises a bin for each frequency-orthogonal signal that is transmitted. In an embodiment, each DFT (which could be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event in proximity to a tixel.

As used herein, the term tixel (a/k/a taxel) refers to the intersection of interaction between any transmitting conductor or antenna and any receiving conductor or antenna. In a grid layout, the term tixel can refer to the interactions occurring at the crossing point (when viewed in plan) between the rows and columns. In receive and transmit antenna layouts, the term tixel can refer to the interactions occurring between any transmit antenna and any receive antenna. For example, in a configuration with three antennas laid out TX1, RX1, TX2 or RX1, TX1, TX2, depending on the proximity of the antenna, a tixel may exist between the RX1 antenna and each TX antenna. Thus, in an embodiment, in either configuration, a touch event can affect both the RX1-TX1 tixel and the RX1-TX2 tixel. Where antenna are set out in a grid (e.g., 3×3) (or in more dimensions) tixels can exist—again, depending on layout and proximity—between each TX and each RX antenna. In an embodiment, a 3×3 grid has 4 TX and 5 RX antennas, and may have as many as 20 tixels. In an embodiment, a 3×3×3 cube of antennas comprising, e.g., 9 TX and 18 RX antennas, may have as many as 162 tixels.

Referring back to the above-mentioned illustrative example having a 4.096 MHz sampling rate, a 1 millisecond integration period and a frequency spacing of 1 kHz, an FFT (or other DFT) will result in 2048 bins providing I and Q components for each of the frequencies from 1 kHz to over 2 MHz. In an embodiment, only center frequencies integer multiples of the minimum frequency spacing (which is the reciprocal of the integration period)—are used. In an embodiment, frequencies may be used that, although orthogonal to the other frequencies being used, are not center frequencies. For example, using the above illustrative example, the frequencies 50.1 kHz and 50.5 kHz are not center frequencies because they are not integer multiples of the minimum frequency spacing. Frequencies that are not integer multiples of the minimum frequency spacing shall be referred to herein as off-center frequencies or OCFs.

In an embodiment, FFT-processed receiver data (or e.g., DFT-processed receiver data) comprising OCFs will fall into two adjacent bins. In an embodiment, the amount of an OCF that will fall into each of the two adjacent bins is proportional to how much the OCF is off center. As an illustration, assume that a 100 kHz center frequency is transmitted, and after the DFT (which could be an FFT) is performed, the bin corresponding to the 100 kHz frequency contained I and Q components of 1.0 and 0.0, respectively. Assuming there is frame-phase alignment, the same result occurs each time if the tixel remains unaffected by touch or noise. In an subsequent frame, assume that instead of transmitting the 100 kHz center frequency, a 100.5 kHz off-center frequency is transmitted, and in an illustrative embodiment, after the FFT is performed, the bin corresponding to the 100 kHz frequency contained I and Q components of about 0.71 and 0.0, respectively and the bin corresponding to the 101 kHz frequency contained I and Q components of about 0.71 and 0.0, respectively. This results because the amplitude values reflecting the off-center frequency were split between the two adjacent bins, and square root of the sum of their squares must equal 1, the amplitude of the signal as it was received for the purpose of this illustration as a center frequency. The amplitudes are also affected by the sinc-squared nature of the Fourier transform frequency-domain window, but we are neglecting that effect for the purposes of this illustration. In an subsequent frame, assume that instead of transmitting the 100.5 kHz off-center frequency, a 100.25 kHz off-center frequency is transmitted, and in an illustrative embodiment, after the FFT is performed, the bin corresponding to the 100 kHz frequency contained I and Q components of about 0.87 and 0.0, respectively and the bin corresponding to the 101 kHz frequency contained I and Q components of about 0.5 and 0.0, respectively. Again, the result occurs because the values reflecting the off-center frequency were split between the two adjacent bins. In practice, the values do not split as evenly as this exemplary and simplified illustration, however, it will be apparent to one of skill in the art in view of this disclosure, that the energy of the transmitted frequency will be split into and represented by two bins, and that the I and Q values represent the in-phase and quadrature amplitudes of that energy.

In an embodiment, off-center frequencies are elected for use as a check against noise. Consider the illustration above using 100.5 kHz, having half of its power showing up in the bin corresponding to 100 kHz and half of its power showing up in the bin corresponding to 101 kHz. In an embodiment, unequal amounts in either bin could be disregarded as noise. This principle would hold for any off-center frequency providing a first proportion of its energy into one bin and a second proportion of its energy into a second bin.

In an embodiment, two off-center frequencies are sent per transmit conductor or antenna. In an embodiment, two off-center orthogonal frequencies are sent per transmit conductor or antenna, and the two off-center orthogonal frequencies are each a known proportion off-center, e.g., the frequency is 20%, 50% or 75% of the way from one center frequency to the next. In an embodiment, two off-center orthogonal frequencies are sent per transmit conductor or antenna, and the two off-center orthogonal frequencies each are a known proportion off-center, and the resulting power distribution between each of the two off-center orthogonal frequencies and their corresponding bins is known. In an embodiment, two off-center orthogonal frequencies are sent per transmit conductor or antenna and thus four bins are used per tixel. In an embodiment, a high frequency off-center signal and a low frequency off-center signal are sent to a transmit conductor or antenna, which results in two low-frequency bins and two-high frequency bins being used per tixel. In an embodiment, the off-center frequencies or signals are orthogonal to each other.

In an embodiment, the frequency of a signal is dithered to achieve a particular aspect, and thus a particular distribution of its power into adjacent bins. In an embodiment, the frequency of a signal is dithered with a code to achieve a particular aspect, and thus a particular distribution of its power into adjacent bins. In an embodiment, the frequency of a signal is dithered with a pseudo-random code to achieve a particular aspect.

Frame-Phase Synchronization

As discussed above, in an embodiment, each of a plurality of frequency-orthogonal signals are operatively driven onto a group of conductors or antennas, and a signals may be received during an integration period (e.g., a sampling period) from the same group of conductors or antennas or from another group of conductors or antennas. It will be apparent to one of skill in the art in view of this disclosure that, over time, a constantly generated plurality of frequency-orthogonal signals will have a repeating sequence, and may cause beats. As described in more detail below, starting the transmission of a plurality of frequency-orthogonal signals where each signal has a known initial phase alignment will make the location of the beat or beats predictable. Moreover, restarting the transmission of a plurality of frequency-orthogonal signals where each signal has a known initial phase alignment before each integration period may prevent an undesirable beat or beats from being sampled.

In an embodiment, signal emitters are correlated with the receivers on a sensor and the receiver initiates its integration period (e.g., a sampling period) at a known time with respect to the sequence of the transmitted data, thus, the data collected can be correlated with the transmission of the emitted signals.

The methods and systems provided herein are used to overcome certain conditions in which noise or other artifacts produce interference with, jitter in, or phantom touches on, the FMT sensor. FMT method may be implemented by driving multiple frequencies simultaneously. The receiver then processes a combined waveform of that may have varying degrees of the multiple frequencies to calculate values for each of the individual driving frequencies e.g., with the use of a DFT (which could be an FFT). Frame-to-frame variation in phase offsets of the driving signals, and thus in the signal supplied to the DFT (which could be an FFT) may create a difference in the resulting calculated values, thereby affecting the accuracy of the FMT sensor.

The present embodiments provide methods and systems for reducing or eliminating undesirable results by mitigating the variation in the calculated values for each of the individual frequencies when the touch device is in the same state of touch. By way of example, in an embodiment, prior to beginning each frame, the signal can be synchronized by resetting all of the emitted signal frequencies to a predetermined, or known, initial phase. Such resetting may be repeated prior to acquisition of all subsequent frames. In an embodiment, the receiver can be set (or triggered) to capture a frame at successive periods when the emitted signal frequencies are known to be in a particular phase and phase relationship. Because the emitted signal frequencies have a beat period, in an embodiment, a frame period (i.e., the reciprocal of the frame frequency) is selected as a multiple of the beat period, thus ensuring that the samples from each frame will be in the same phase and phase relationship as the previous frame.

Several approaches are illustrated below to mitigate the variation in calculated values for the individual frequencies. Generally, each of the approaches endeavors to make the repeating capture operations, which to exploit the claimed touch detector are captured one after another (but not necessarily one immediately after another), capture frames of data that are identical in phase. In other words, the captured data is frame-phase synchronized between frames. In various embodiments, this can be accomplished by reinitiating transmission of the signal, at a known initial phase, at a known time before capture. As used herein, "known initial phase" means that the initial phase is predetermined or the phase is generated at the time of the initial transmission and it becomes known in subsequent frames. In various embodiments, this can be accomplished by continuously transmitting, but determining when frames will be frame-phase synchronized and delaying capture until the frame-phase synchronization. The several embodiments below illustrate a variety of systems and methods for frame-phase synchronization, but are not intended to limit the scope of the claims. Other systems and methods of frame-phase synchronization to improve touch data will become apparent to persons of skill in the art in view of this disclosure, and are thus included within the scope of this disclosure.

A method for synchronizing one or more simultaneously transmitted signals on a touch detector may involve one or more of the processing operations as described below. In an embodiment, the touch detector comprises a matrix comprising "N" rows and "M" columns of conductive material, the touch detector is arranged such that the paths of each of the "N" rows in the matrix crosses the path of each of the "M" columns in the matrix. In an embodiment, the touch detector comprises a receiver associated with each of the "M" columns and at least one signal processor. (In an embodiment, instead of the rows and columns, the touch detector comprises a plurality of antenna as illustrated in FIG. 2, and the touch detector comprises a receiver associated with each of the receive antenna and a signal processor). The transmission of signals is initiated on each of the rows (or transmit antennas) of the matrix. In an embodiment, transmission is achieved by supplying signal-related values to a DAC that is connected to the rows (or transmit antennas). The transmitted signals are frequency-orthogonal to each other, and the transmitted signals each have a specific initial phase. At a predetermined time after the signal transmission is initiated, a frame of data is captured for each of the columns of the matrix (or receive antennas), the frames of data captured represents the signals present on the corresponding column (or receive antennas) during the frame capture time. In an embodiment, the frame of data is captured by sampling the columns (or receive antennas) using an ADC. These steps of initiating transmission, waiting and capturing frames is repeated, providing map of data that show changes in time associated with touch, but mitigating phase-related artifacts that could show up as noise or changing touch data. It will hereafter be apparent to one of skill in the art in view of this disclosure that the use of antennas or conductors (e.g., row/column), for these purposes, can be interchangeable.

A basic one-row, one-column touch detector apparatus is described to illustrate some of the principles discussed above. A row conductor and a column conductor are arranged such that the path of the row conductor crosses the path of the column conductor. A clock having a predetermined periodicity is provided. A signal emitter is adapted to initiate transmission of a signal at each of a plurality of intervals on the clock starting at a first time. Each time the transmission of the signal is initiated, the signal has the same initial phase as that signal had when transmissions of that signal was previously initiated. A receiver is adapted to start receiving a frame of data on the column at each of the plurality of intervals starting at a second, later time. And a signal processor is adapted to determine one of a range of measures of the signal present within the received frame, the one measure being reflective of touch.

The following illustrative embodiment discloses a touch detector apparatus having multiple rows and/or columns. A matrix of "N" rows and "M" columns of conductive material is arranged so that the paths of each of the rows in the matrix crosses the path of each of the columns. The illustrative touch detector also has a clock having a predetermined periodicity. Signal emitters are used to transmit unique signals on to each of the rows. The transmission is initiated at each of a plurality of intervals on the clock starting at a first time. In an embodiment, each of the transmitted signals is orthogonal to each of the other transmitted signals. In this illustrative embodiment, each of the transmitted signals has a known or predetermined initial phase—namely a phase that is the same each time its transmission is initiated. A receiver, receives a frame on each of the columns at each interval starting at a later time, that is, a time after transmission is initiated. The delay between transmission initiation and receiving allows signal propagation to normalize in the matrix, overcoming e.g., inertia. A signal processor is used to determine one of a range of measures for each of the transmitted signals, reflecting a value for presence of the transmitted signal within the received frame. In an embodiment, the signal processor and the receiver may be part of the same component. In another embodiment, the signal processor and the receiver are not part of the same component.

Figure 3:
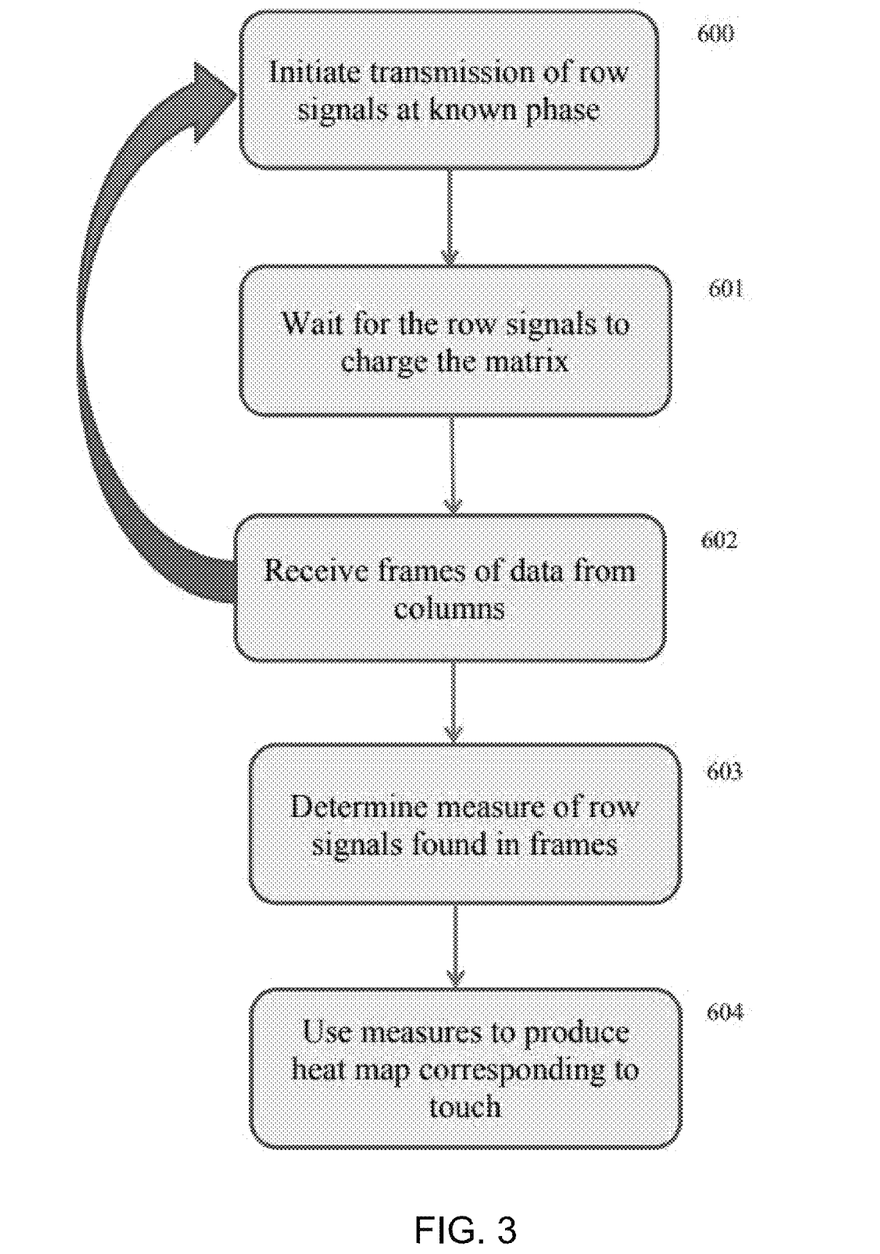
FIG. 3 is a functional block diagram illustrating an embodiment of frame-phase synchronization.

An illustrative embodiment of a method for determining measurements related to touch on a touch detector is also provided and shown in FIG. 3. In this method, a touch detector has a matrix comprising "N" rows and "M" columns of conductive material. The touch detector is arranged such that the paths of each of the "N" rows in the matrix cross the paths of each of the "M" columns in the matrix. The touch detector further having a receiver associated with at least one of the "M" columns, and at least one signal processor. The method including repeatedly: (i) initiating a transmission of a row signals at a known phase 600; (ii) waiting for the row signals to normalize in the matrix (e.g., to charge the matrix) 601; and (iii) receiving frames of data from columns 602. A measure of row signals found in the frames may be determined as shown in step 603. In an embodiment, an amount of row signal found on a column may be determined using an FFT function on the frame. In an embodiment, the FFT function will include both in-phase (I) and quadrature (Q) components representing an amount of row signal. While noise and other artifacts may also be found on the column, touch from a touch detector is intended to be the predominant cause of the FFT measure. In an embodiment, the sum of the squares of the I and Q components is used as measure corresponding to a signal strength. In an embodiment, the square root of the sum of the squares of the I and Q components is used as measure corresponding to signal strength. In an embodiment, the measures may be used to produce a heat map corresponding to touch (e.g., signal strength) as shown in step 604.

Another illustrative method for determining measurements related to touch on a touch detector comprising a matrix of rows and columns of conductive material. The illustrative touch detector comprises a receiver associated with at least one of the columns. The method consists of repeatedly: (i) initiating a transmission of signals, each of the signals being transmitted on respective ones of the rows of the matrix, each of the signals being frequency-orthogonal to each of the other signals, and each of the signals being at a known initial phase; (ii) waiting a predetermined period of time after initiating the transmission, the predetermined period of time being at least sufficient for the signals to charge the matrix; and (iii) receiving on the receiver a frame of signals present on each of the columns of the matrix during a second predetermined period of time, the step of receiving beginning immediately after the predetermined period of time. The known initial phase for each of the signals may be predetermined, or if not predetermined, may be repeated as the method is repeatedly carried out, and may be the same as, or differ from the known initial phase of each other of the signals. In this way, each frame captured should have similar alignment of the phase of each respective signal. Once the capture is complete, the frames may be processed to determine a measure of the frequency-orthogonal signals present on the columns when it was captured. In an embodiment, the measure may be made by taking an FFT of the frame. Changes in the FFT values from one frame to the next are reflective of touch.

Another illustrative embodiment of an apparatus for measuring a level of a transmitted signal on a touch detector is also described using a touch detector having a first and second row conductor and a column conductor, arranged such that the path of each of the first and second row conductors cross the path of the column conductor. Signal emitters are adapted to transmit orthogonal signals on row conductors, respectively. A receiver receives a frame on the column at an interval related to the beat frequency of the orthogonal signals. A signal processor may be used to determine a measure of each of the signals present within the received frame—and thus, the capacitive response of the touch detector. In an embodiment, the signal processor and the receiver are part of the same component. In another embodiment, the signal processor and the receiver are not part of the same component. In an embodiment, the interval is a multiple of the beat frequency of the orthogonal signals.

Yet another illustrative apparatus for measuring a level of a plurality of orthogonal signals in a touch detector is also described using a touch detector having a matrix comprising rows and columns of conductive material, arranged such that the path of the matrix of rows and columns cross. A plurality of signal emitters each adapted to transmit one of a plurality of orthogonal signals onto a row of the matrix, each of the plurality of orthogonal signals being orthogonal to each of the other of the plurality of orthogonal signals, and the plurality of orthogonal signals having a beat frequency. The beat frequency has a periodic beat. A receiver starts receiving a frame on one of the columns of the matrix at a time related to the periodic beat of the beat frequency. A signal processor adapted to determine a measure of each of the plurality of orthogonal signals present within the received frame. In an embodiment, the signal processor and the receiver are part of the same component. In an embodiment, the signal processor and the receiver are not part of the same component. In an embodiment, the receiver receives a frame, periodically, at an interval related to the beat frequency of the plurality of orthogonal signals.

A further illustrative apparatus for measuring a level of a transmitted signal on a touch detector includes a first row conductor, and a first column conductor, arranged such that the path of the first row conductor crosses the path of the first column conductor. A clock having a predetermined periodicity is present. A first signal emitter adapted to initiate a plurality of temporally separate transmissions of a signal, each transmission of a signal starting at a time according to the clock, and the signal having a known initial phase. A receiver, adapted to receive a frame from a column, the frame comprising at least a portion of one of the plurality of temporally separate transmissions. The receiver adapted to start receiving the frame from the column at a later time according to the clock, the later time on the clock being after the corresponding transmission starting time. A signal processor adapted to determine a measure of the first signal present within each received frame. In an embodiment, this measure may be made by an FFT of the frame for the column conductor. In an embodiment, the measure may include both in-phase and quadrature components. In an embodiment, the signal processor and the receiver are part of the same component. In another embodiment, the signal processor and the receiver are not part of the same component.

Yet a further illustrative apparatus for measuring a level of transmitted signals on a touch detector includes a matrix comprising rows and columns arranged such that the path of each of the rows crosses the path of each of the columns. A clock having a predetermined periodicity is present. Signal emitters adapted to initiate a plurality of transmissions at different times. Each of the plurality of transmissions starting at a different time according to the clock. Each of the plurality of transmissions comprising a plurality of orthogonal signals. Each of the signal emitters transmitting a unique one of the plurality of orthogonal signals on a unique one of the rows during each of the plurality of transmissions occurring at different times. Each of the plurality of orthogonal signals has the same initial phase. A receiver adapted to receive a frame from each of the columns, each of the frames comprising at least a portion of one of the plurality of transmissions, and adapted to start receiving the frame from the column at a later time according to the clock. This later time on the clock being after the corresponding transmission starting time. And a signal processor adapted to determine a measure of each of the plurality of orthogonal signals present within each of the received frames. In an embodiment, the measures may be made by an FFT of the frame for the columns. In an embodiment, the measures may include both in-phase (I) and quadrature (Q) components. In an embodiment, the sum of the squares of the I and Q components is used as measure corresponding to signal strength. In an embodiment, the square root of the sum of the squares of the I and Q components is used as measure corresponding to signal strength. In an embodiment, the signal processor and the receiver are part of the same component. In another embodiment, the signal processor and the receiver are not part of the same component.

Phase Measurement

As discussed far above, it has been understood for several years that a measure corresponding to signal strength in a given bin (e.g., $(I^2+Q^2)$ or $(I^2+Q^2)^{1/2}$) changes as a result of a touch event proximate to a tixel. Because the square-root function is computationally expensive, the former $(I^2+Q^2)$ is often a preferred measurement. Attention has not been focused on phase shift occurring as a consequence of touch, likely because in an uncorrelated system, the phases of the signals received tend to be random from frame to frame. The recent development of the above-described frame-phase synchronization was directed to overcoming certain conditions in which noise or other artifacts produce interference with, jitter in, or phantom touches on an FMT sensor. Nonetheless, according to the reference, frame-phase synchronization was used in an effort to better measure the signal strength. Synchronization of the phase from frame to frame, however, led to the discovery that touch events affect the phase of signals, and thus, touch events can be detected by examining changes in the phase corresponding to a received frequency (e.g., a bin). Thus, in addition to the received signal strength, the received signal phase also informs detection. In an embodiment, phase changes are used to detect touch events. In an embodiment, a combination of changes in signal strength and changes in phase are used to detect touch events. In an embodiment, a touch delta (a vector representing a change of phase and the change in signal strength of the received signal) is calculated. In an embodiment, touch events are detected by examining the change in a touch delta over time.

The implementation of frame-phase synchronization provides an opportunity for obtaining another potential source of data that can be used for detecting, identifying and/or measuring a touch event. At least some of the noise that affects the measurement of the signal strength may not affect the measurement of phase. Thus, this phase measurement may be used instead of, or in combination with a signal strength measurement to detect, identify and/or measure a touch event. For the avoidance of doubt, it is within the scope of detecting, identifying and/or measuring a touch event to detect, identify and/or measure hover (non-touch), contact and/or pressure.

Absent frame-phase synchronization, even in the absence of other stimuli (such as touch), phase may not remain stable from one frame to another. In an embodiment, if phase were to change from one frame to another (e.g., due to lack of synchronization) the information that could be extracted from changes in the phase may not reveal meaningful information about a touch event. In an embodiment, synchronization of phase for each frame (e.g., by methods discussed) in the absence of other stimuli, phase remains stable frame-to-frame, and meaning can be extracted from frame-to-frame changes in phase.

It should be noted that while the frame-phase synchronized systems provided the basis for the present disclosure and the phase-related measurement and inventions described herein, it is not strictly necessary to synchronize the frame-to-frame phase in order to have changes in the phase may reveal meaningful information about a touch event. Instead, in an embodiment, the receiver obtains information about the phase of a signal as transmitted, and uses that information to normalize the phase as received. Consider for discussion an exemplary system having the following operations repeated: transmission of row signals at a known phase begins; then the system waits a predetermined time for the row signals to charge the matrix; and then a frame of data is received from the columns. In an embodiment, provided that the "known phase" is the same each time, the system is said to have frame-phase synchronization because the where there are no touch events (or noise), the phase in each frame will remain constant. In an different embodiment, where the "known phase" varies from instance to instance (e.g., shifts 10 degrees clockwise in each frame or randomly) the phase in each frame will also shift from frame to frame, making direct frame-to-frame comparisons of phase data lack meaningful information about a touch event. Nonetheless, to the extent there is a known phase at initiation and that known phase is known to the signal processor (which may be in the same integrated circuit as the transmitter), that known phase information can be used to normalize the received phase so that frame-to-frame comparisons can be made. The point being that although a frame-phase synchronization can support the present methods and apparatus for phase detection of touch events, they are not necessary. Instead, in an embodiment, what is needed is a knowledge of the transmit phase information during signal processing.

In an embodiment, heatmaps reflecting a measure of signal strength (often post-processed heatmaps, see e.g., U.S. Pat. No. 9,158,411 entitled Fast Multi-Touch Post Processing) are often used in the identification of touch events from a sensor. Elements in the heatmap generally reflect measurements corresponding to tixels or may be interpolated values based on measurements corresponding to tixels. See e.g., U.S. Pat. No. 9,158,411. In an embodiment, heatmaps reflecting changes in a measure of signal strength are used in the identification of touch events from a sensor. Heatmaps reflecting a measure of signal strength or changes in a measure of signal strength will be collectively and individually referred to herein as Magnitude Heatmaps. In various embodiments, identification of local maxima, or watershed transforms, are used with Magnitude Heatmap to identify or help identify touch events.

In an embodiment, heatmaps reflecting signal phase or changes in signal phase (hereinafter, collectively and individually, Phase Heatmaps) may be used to identify or help identify touch events. Phase Heatmaps differ in kind from Magnitude Heatmaps as they do not reflect any measure of signal strength. Said differently, the Phase Heatmap will not change as a result of whether the received signal strength goes up or down as a result of a touch event at a tixel. Instead, the Phase Heatmap reflects a different phenomenon altogether. The Phase Heatmap is affected by changes in the measured phase of the received signal. In an embodiment, the Phase Heatmap will change as a result a phase shift in the received signal (clockwise or counterclockwise) as result of a touch event at a tixel. Noise in the phase domain may also affect the Phase Heatmap. It is believed that not all noise affecting signal strength measurements will affect phase measurements, and not all noise affecting phase measurements will affect signal strength measurements. Thus, the combination of a Phase Heatmap and a Magnitude Heatmap should produce a lower noise result. In an embodiment, touch events identified on one heatmap and but not present on the other are ignored. In an embodiment, potential touch events identified by being above one threshold but below another threshold on one heatmap are ignored unless they are corroborated by potential touch events identified as being above a threshold on the other heatmap. It will be apparent to a person of skill in the art in view of this disclosure that there are many ways to use the Phase Heatmap in combination with the Magnitude Heatmap.

In an embodiment, phase measurements are used to provide information about the status of the sensor, and change in phase measurements over time are used to provide information about touch events. In an embodiment, a heatmap of phase measurements is generated for each frame. A heatmap is a way of visualizing (and storing) the phase data, it should be understood that other ways of processing the phase data may also be used. Now, in addition to magnitude data taken from the received signals, or instead of the magnitude data, phase data can be used in order to provide information about a touch event.

For example, in an embodiment, a Phase Heatmap can be used in order to check the accuracy of a Magnitude Heatmap. The Phase Heatmap and the Magnitude Heatmap can be compared in order to verify the changes that are occurring due to touch events. Discrepancies between the two heatmaps can be disregarded or alternatively handled, e.g., with touch events or conditions where the magnitude-related data may be more reliable or less reliable than the phase-related data.

In an embodiment, the Phase Heatmap can be used to complement the Magnitude Heatmap. The Phase Heatmap can provide data that gives more insight into the touch event when used to complement the Magnitude Heatmap.

In an embodiment, the Phase Heatmap may be used or preferred for selected touch events, for example, for hover or for determining an approach. The Phase Heatmap may provide additional insight regarding touch events at far distances.

Exploration of the use of phase-related data led to potential applications of phase-related data measurements. In an illustrative embodiment, a tixel comprises a transmit antenna that is used to transmit two different frequency-orthogonal signals, one at a relatively low frequency and the other at a relatively high frequency. While there is noise and jitter in all measurements, it has been observed that phase-related data for the lower frequency signal appears to have less jitter for more distant hover-type touch events, while the magnitude-related data for the higher frequency signal appears to have less jitter for nearer, touch-type touch events.

In an embodiment, multiple (two or more) frequency-orthogonal signals are used for one or more tixels. In an embodiment, a Magnitude Heatmap is generated for the high frequency signals and a Phase Heatmap is generated for the low frequency signals, and both heatmaps are used to determine touch (including hover). In an embodiment, a Magnitude and a Phase Heatmap are generated for both the high and low frequency signals, in determining touch, the Magnitude Heatmap is weighted heavier with respect to the high frequency signal and the Phase Heatmap is weighted heavier with respect to the low frequency signal. In an embodiment, a Magnitude and a Phase Heatmap are generated for both the high and low frequency signals, in determining touch, a Magnitude and a Phase Heatmap are generated for both the high and low frequency signals, in determining touch, and both heatmaps are used in determining touch.

Stated differently, the use of phase-related data is coupled with an observation that (other things being equal) low frequency signals appeared to have tixels that are affected by touch further away from the surface than signals with higher frequencies. A further observation is that the phase-related data may be more relevant for some frequencies over others. In other words, the phase data for the higher frequencies, i.e., the frequencies with further extending fields, may be more reliable and/or consistent than the magnitude-related data at distances further away from the touch surface.

Referring back to FIG. 1, an embodiment of a sensor 100 is shown. The sensor has a row conductor 201 and a column conductor 301 that cross (when viewed in plan), but are separated from one-other by air or a dielectric material (not shown) at tixel 401. In an embodiment, a plurality of orthogonal signals are transmitted over the row conductor 201. In an embodiment, the signals are frequequency orthogonal. The plurality of signals transmitted over the row conductor 201 interact with the column conductor 301 at tixel 401 where the two are proximate (e.g., where they cross). While the tixel 401 is shown as being at a location where the row conductor 201 and the column conductor 301 cross, it should be understood that this is for illustrative purposes only and that the tixel 401 may be at any location where there is coupling between the row conductor 201 and the column conductor 301 (or similar structures like antennas, plates or dots). Although only one row and one column are shown, many of each may exist forming a grid.

In an embodiment, a receiver (not shown) receives and digitizes signals on column conductor 301. In an embodiment, the signals are digitized for a period of time, and the digitized signals are sent to a signal processor (also not shown) where they are processed to determine a measure for each signal transmitted over the row conductor 201. As discussed above, digitization may take place at any speed. In an embodiment, at least 1 MHz. In an embodiment, any time window (integration period) may be used for sampling. In an embodiment, 4096 samples are taken a 4 MHz (approximately 1 millisecond). The transmitted orthogonal frequencies should have a spacing between each signal that is not less than the reciprocal of the integration period. In an embodiment, the transmitted orthogonal frequencies have a spacing between each signal that is the reciprocal of the integration period. For a frequency spacing of at least 1 Khz is used for an integration period of 1 ms.

In an embodiment, the digitized signals are processed by a DFT (which could be an FFT) and an I and Q component are determined for each signal transmitted over the row conductor 201. In an embodiment, the conductors or antennas on the sensor 100 are operatively connected to transmitters and receivers in an integrated circuit capable of transmitting and receiving the required signals. In an embodiment, the integrated circuit is also capable of acting as the signal processor. In an embodiment, the integrated circuit contains a communications channel to a GPU where some or all of the signal processing is done. In an embodiment, the communications channel comprises SPI, or multi I/O SPI such as quad-SPI.

In an embodiment, the transmitters and receivers are each operatively connected to a different integrated circuit capable of transmitting and receiving the required signals, respectively. In an embodiment, the transmitters and receivers for all or any combination of patterns may be operatively connected to a group of integrated circuits, each capable of transmitting and receiving the required signals, and together sharing information necessary to such multiple IC configurations. In an embodiment, where the capacity of the integrated circuit (i.e., the number of transmit and receive channels) and the requirements of the patterns (i.e., the number of transmit and receive channels) permit, all of the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, a hub is used to aggregate the information from each circuit which is combined and processed in a separate system. In an embodiment, the separate system comprises a GPU and software for signal processing.

In an embodiment, a signal is transmitted on the transmitter row 201. In an embodiment, more than one signal is transmitted on the transmitter row 201 with each of the signals transmitted on the transmitter row 201 orthogonal to each other. In an embodiment, more than one signal may be transmitted on the transmitter row 201 with each of the signals transmitted on the transmitter row 201 being frequency orthogonal and range from a lowest to highest frequency.

In an embodiment, more than one signal may be transmitted on the transmitter row 201 with each of the signals transmitted on the transmitter row 201 being frequency orthogonal and at least 10 kHz apart in frequency. In an embodiment, more than one signal may be transmitted on the transmitter row 201, with each of the signals transmitted on the transmitter row 201 being frequency orthogonal and between 10-50 kHz apart in frequency. In an embodiment, more than one signal may be transmitted on the transmitter row 201 with each of the signals transmitted on the transmitter row 201 being an integer frequency that is frequency orthogonal to and at least 1 kHz apart from the other integer frequencies. In an embodiment, more than one signal may be transmitted on the transmitter row 201 with each of the signals transmitted on the transmitter row 201 being an integer frequency that is frequency orthogonal to and at least 1 kHz, but not more than 1 MHz apart from the other integer frequencies.

When two frequency-orthogonal signals are being transmitted, one of the transmitted signals is deemed high frequency and the other is deemed low frequency. In an embodiment, a low frequency of 200 kHz and a high frequency of 399 kHz, thus keeping the low and high frequency within one octave. In an embodiment, a low frequency of 50 kHz and a high frequency of 199 kHz. In an embodiment, a low frequency of 100 kHz and a high frequency of 1.5 MHz.

In an embodiment, when three frequencies are being transmitted, one of the transmitted frequencies is deemed the high frequency, one deemed the low frequency and a third is deemed a mid frequency that falls between the high and low frequencies. For example, the low frequency may be 50 kHz and the high frequency may be 100 kHz, while a third frequency may be 75 kHz. In an embodiment, more than three frequencies are transmitted.

In an embodiment, when more than two frequencies are being transmitted, one of the transmitted frequencies may be considered the high frequency, one of the transmitted frequencies may be considered the low frequency and the other potential plurality of frequencies may fall within a frequency range near the high and low frequencies. For example, the low frequency may be 50 kHz and the high frequency may be 100 kHz, and two other frequencies may fall within 10 kHz of these values. For example the other two frequencies may be 55 kHz and 95 kHz. Providing additional orthogonal frequencies within a certain range of the highest and lowest frequencies can provide additional information regarding the phase shift.

In an embodiment, multiple transmit conductors or antennas are each used to transmit multiple orthogonal frequencies. In an illustrative embodiment, 4096 samples are taken a 4.096 MHz (to make the math easy for the illustration), and the transmitted orthogonal frequencies have a spacing between each signal that is the reciprocal of the integration period. The following tables provides an illustrative example, the first of the use of a high and a low frequency, within an octave, for five transmit antennas:

|  | Low | High |
| --- | --- | --- |
| TX1 | 50 kHz | 90 kHz |
| TX2 | 51 kHz | 91 kHz |
| TX3 | 52 kHz | 92 kHz |
| TX4 | 53 kHz | 93 kHz |
| TX5 | 54 kHz | 94 kHz |

The following table provides an illustrative example of the use of three frequencies, within an octave, for five transmit antennas:

|  | Low | Third | High |
| --- | --- | --- | --- |
| TX1 | 200 kHz | 250 kHz | 350 kHz |
| TX2 | 201 kHz | 251 kHz | 351 kHz |
| TX3 | 202 kHz | 252 kHz | 352 kHz |
| TX4 | 203 kHz | 253 kHz | 353 kHz |
| TX5 | 204 kHz | 254 kHz | 354 kHz |

The following table provides an illustrative example of the use of three frequencies for five transmit antennas:

|  | Low | Third | High |
| --- | --- | --- | --- |
| TX1 | 250 kHz | 750 kHz | 1.204 MHz |
| TX2 | 251 kHz | 751 kHz | 1.203 MHz |
| TX3 | 252 kHz | 752 kHz | 1.202 MHz |
| TX4 | 253 kHz | 753 kHz | 1.201 MHz |
| TX5 | 254 kHz | 754 kHz | 1.200 MHz |

In each example, the transmitted orthogonal frequencies have a 1 kHz spacing between each signal.

In an embodiment, the field generated by a low frequency signal and the field is generated by a higher frequency signal differ in that the field associated with the low frequency signal is believed to extend further from the tixel than the field created with the higher frequency. In an embodiment, a height above a touch surface corresponds to a distance from a tixel (such height sometimes referred to herein as the Z-axis, where X- and Y- refer to translation across the touch surface).

It has been suggested by observation that, to some degree:
(i) at a relatively large Z-axis height,
   (a) a tixel's low-frequency interactions appear smoother when measured in the phase domain than in the magnitude domain,
   (b) a tixel's low-frequency interactions in both the magnitude and phase domain appear smoother than when compared to the tixel's high-frequency interaction; and
(i) at a relatively small Z-axis height,
   (a) a tixel's high-frequency interactions appear smoother when measured in the magnitude domain than in the phase domain,
   (b) a tixel's high-frequency interactions in both the magnitude and phase domain appear smoother than when compared to the tixel's low-frequency interaction.

In an embodiment, the measurements made by a sensor with respect to various frequencies and in magnitude and phase may be weighted or otherwise applied in an uneven manner. In an embodiment having a high and low frequency and both phase and magnitude measurements, as a finger first comes into interacting proximity with a tixel, one weighting is applied to understand the touch event; then as the finger moves closer to the tixel, another weighting is applied to understand the touch event; and finally, as the finger makes contact and begins exerting pressure at the tixel, yet another weighting is applied to understand the touch event. In an embodiment having a high a low frequency and both phase and magnitude measurements, as a finger first comes into interacting proximity with a tixel, one weighting is applied to understand the touch event (e.g., low frequency phase information is more heavily weighted); then as the finger moves closer to the tixel, another weighting is applied to understand the touch event (e.g., a balance between low frequency and high frequency magnitude and phase information); and finally, as the finger makes contact and begins exerting pressure at the tixel, yet another weighting is applied to understand the touch event (e.g., high frequency magnitude information is more heavily weighted). It will be apparent to a person of skill in the art in view of this disclosure that there will be many different application-specific or application-preferred manners to use the touch-event related data from multiple frequencies and from the magnitude and phase domains, to interpret the touch events causing the changes on a sensor, all of which are intended to fall within the scope and spirit of this disclosure. Experimentation with particular configurations to determine adequate or preferred combinations of the use of this data is within the skill in the art in view of this disclosure and its discovery of the principles and concepts described herein. In sum, the relative sensitivities of the low frequency signals and the high frequency signals with respect to the magnitudes and phases can provide more information regarding a touch event. The additional information can provide a clearer and more predictable, i.e., less jittery or random, interpretation of movements associated with the touch event.

In an embodiment, the phase information of a touch event in the low frequency range can provide a clearer view of what is occurring with a touch event high on the Z-axis. The magnitude of a touch event in the high frequency range can provide a clearer view of what is occurring with a touch event low on the Z-axis, when compared with events high on the Z-axis. The magnitude data low on the Z-axis and the phase data high on Z-axis can provide a better overall view of a touch event across a larger range of the Z-axis.

In an embodiment, a plurality of frequencies may be used which will produce multiple levels of field sensitivity along the Z-axis. Both the magnitude and phase information taken from a touch event may be combined to create a composite view of a touch event. In an embodiment, magnitude information may only be taken from low on the Z-axis while phase information may only be taken from high on the Z-axis. In an embodiment, magnitude information may be taken from both low and high on the Z-axis, while phase information may be taken only from high on the Z-axis. In an embodiment magnitude and phase information may be taken from both high and low on the Z-axis.

In an embodiment, keyboards may be made that are able to detect touch events using both phase and magnitude data as discussed above. The use of both the phase and magnitude data may provide a better range of interactivity for a user of a keyboard. It should be understood that while keyboards were mentioned above, the discoveries, methods and apparatus discussed herein are more generally applicable, and can be used, for example, in connection with sensors used in touchpads, handheld controllers, automotive cockpit applications (steering wheel, seat, console), musical instruments, motorcycle interfaces (handlebars, seats), transparent displays, detection of active and passive objects (e.g., stylus), gaming and sporting objects (e.g., bats, balls, grips), and for numerous other sensor-based applications.

Displacement Vector

At hover and distances high on the z-axis, the magnitude and phase data may not be significantly above baseline variance. This may make the magnitude or phase data, or both, less reliable for the detection of far hover and proximity (even longer) touch events—i.e., touch events far from the tixel where its measurements are being taken.

Another observation made as a consequence of experiments with phase frame synchronized systems is that a touch delta (vector) can be measured and used to describe touch interaction. A touch delta can be inexpensively determined (computationally) from successive IQ measurements.

In an embodiment, a baseline touch delta is calculated by averaging each of a plurality of I and Q components during baseline conditions (e.g., no detected touch). In an embodiment, the baseline touch delta can be updated (e.g., re-calculated) periodically or continuously to account for baseline changes. Baseline changes may be environmental or otherwise.

Figure 4:
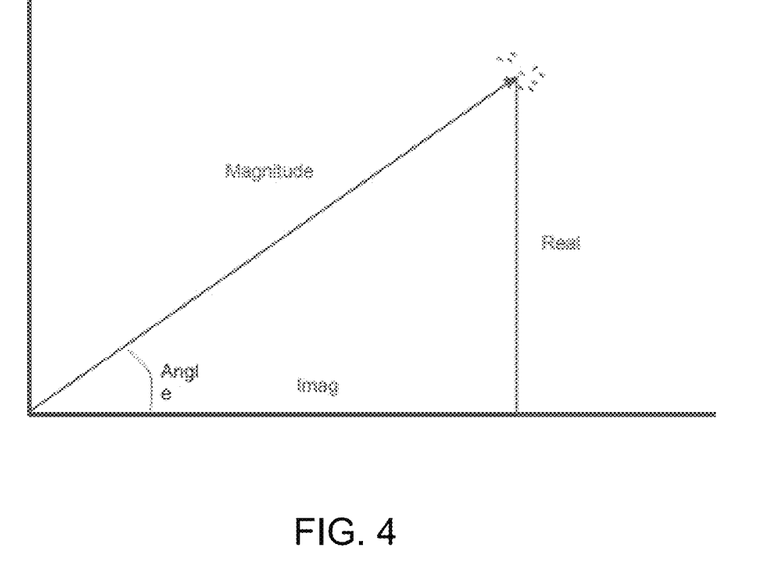
FIG. 4 is a graph illustrating an exemplary result of a touch event.

The baseline can be calculated using the real and imaginary components of a discrete Fourier transform, e.g., FFT. For example, the baseline may be calculated by using 100 samples in baseline conditions in order to obtain an average real component and an average imaginary component. This will then result in an average magnitude component such as shown in FIG. 4. More specifically, FIG. 4 illustrates a vector (magnitude) representing an average of real (I) and imaginary (Q) components for a plurality of samples taken during baseline conditions.

Figure 5:
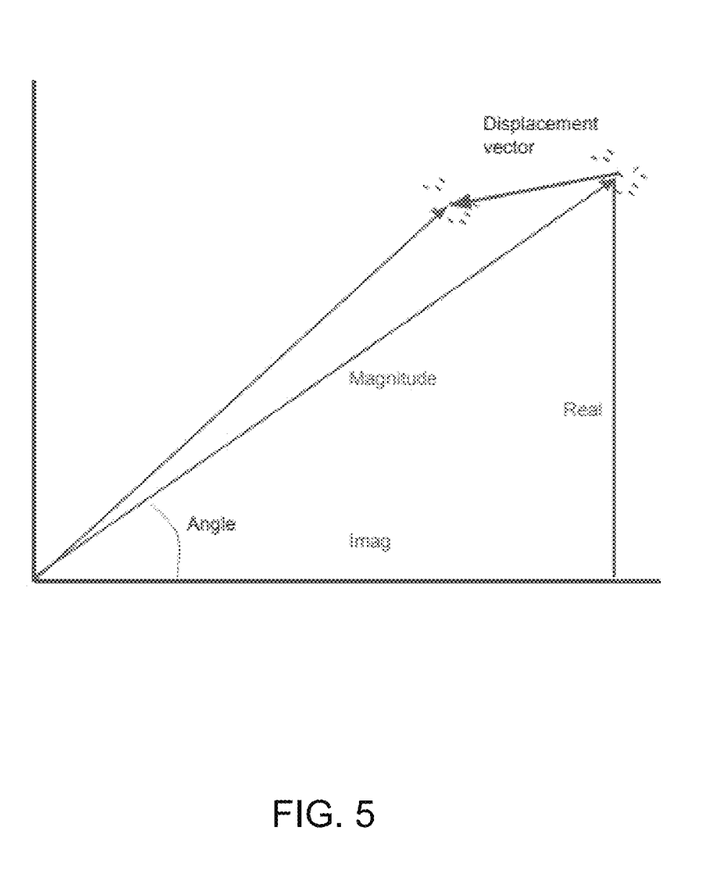
FIG. 5 is a graph showing an exemplary displacement vector from the exemplary result of a touch event shown in FIG. 4.

The change in magnitude and phase angle from frame to frame can be used to calculate a displacement vector such as shown in FIG. 5. In an embodiment, the displacement vector can be inexpensively calculated (computationally) by subtracting the I and Q components of the baseline from the I and Q components of the measured signal.

Certain touch deltas can be ignored, e.g., not treated as touch-related data, because of their characteristics. In an embodiment, changes in magnitude (i.e., touch delta magnitude) below a certain threshold are ignored. In an embodiment, touch delta phase angles that are not consistent with rotation due to touch objects are ignored. In an embodiment, in a given system where it has been observed that a touch delta phase angles resulting from touch events are counter-clockwise within a given range (around a standard IQ 2D axis), variations from the touch-event related counterclockwise direction range may be disregarded, e.g., clockwise touch delta phase angles can be ignored. In an embodiment, both touch delta magnitude and phase angle ranges are used as a basis to reject (ignore) data from the sensor.

In an embodiment, a number of displacement vectors may be collected and used to create a heatmap of the displacement vector magnitudes. In an embodiment, a displacement vector heatmap can be used as a check on the accuracy of the Magnitude Heatmap. In an embodiment, the displacement vector heatmap can be used to complement the Magnitude Heatmap. In an embodiment, the displacement vector heatmap may be used for only a select few touch events, for example, for hover or for determining an approach. In an embodiment, the displacement vector heatmap and the Phase Heatmap can be used as a check on the accuracy of the Magnitude Heatmap. In an embodiment, the vector displacement heatmap and the Phase Heatmap can be used to complement the Magnitude Heatmap. In an embodiment, the displacement vector heat map and the Phase Heatmap may be used for only a select few touch events, for example, for hover or for determining an approach. In an embodiment, the Phase Heatmap, the displacement vector heatmap and the Magnitude Heatmap can be used together to determine/validate/reject touch events.

In an embodiment, the changes in the displacement may be used to provide a check of touch data at a distance further from a touch surface than either phase data or magnitude data can provide by themselves. In an embodiment, the displacement vectors are used to reinforce existing touch data. In an embodiment, the displacement vectors are used to improve the likelihood that frame measurements are only susceptible to actual touch objects.

With the use of three representations of touch event data; magnitude, phase and vector displacement, a more complete view of a touch event and the surrounding environment is possible.

The several embodiments discussed above illustrate a variety of systems and methods for phase measurement, but are not intended to limit the scope of the claims. Other systems and methods of using phase measurement to improve touch data will become apparent to persons of skill in the art in view of this disclosure, and are thus included within the scope of this disclosure.

It is understood that each block of the block diagrams or operational illustrations, and combinations of blocks in the block diagrams or operational illustrations, when used or discussed above, may be implemented by means of analog or digital hardware and computer program instructions. Computer program instructions may be provided to a processor of a general purpose computer, special purpose computer, ASIC, or other programmable data processing apparatus, such that the instructions, which execute via a processor of a computer or other programmable data processing apparatus, implements the functions/acts specified in the block diagrams or operational block or blocks.

Except as expressly limited by the discussion above, in some alternate implementations, the functions/acts noted in blocks may occur out of the order noted in any operational illustrations. For example, the order of execution if blocks shown in succession may in fact be executed concurrently or substantially concurrently or, where practical, any blocks may be executed in a different order with respect to the others, depending upon the functionality/acts involved.

While the invention has been particularly shown and described with reference to a preferred embodiment thereof, it will be understood by those skilled in the art that various changes in form and details may be made therein without departing from the spirit and scope of the invention.

What is claimed is:

1. An apparatus comprising:
a plurality of antennas mounted on a substrate;
a signal generator conductively connected to each of at least a first group of the plurality of antennas, the signal generator adapted to generate a plurality of distinct signals during a plurality of sequential integration periods, wherein the plurality of sequential integration periods are frame-phase synchronized;
a signal receiver conductively connected to each of at least a second group of the plurality of antennas, the signal receiver adapted to take a sequence of digital samples of signals on each of at least a second antenna group during the plurality of sequential integration periods;
a signal processing system operatively connected to the signal receiver, the signal processing system being adapted to:
perform a discrete Fourier transform on each sequence of digital samples taken during each of the plurality of sequential integration periods;
determine a phase angle corresponding to each of the plurality of distinct signals in each sequence of digital samples for each of the plurality of sequential integration periods; and
utilize the phase angle of at least one of the plurality of distinct signals to identify a touch event, wherein the phase angle is used to form a heatmap.

2. The apparatus of claim 1, wherein a phase relationship of at least one of the plurality of sequential integration period's phase angle is known with respect to another one of the plurality of sequential integration period's phase angle.

3. The apparatus of claim 2, wherein the phase relationship is determined by subtracting a known phase variation.

4. The apparatus of claim 2, wherein the phase relationship is determined by having the signal generator use a known starting phase angle.

5. The apparatus of claim 1, wherein only integration periods having a known phase angle are used.

6. The apparatus of claim 1, wherein the discrete Fourier transform is a Fast Fourier transform.

7. The apparatus of claim 1, wherein the signal processing system is further adapted to determine a magnitude of at least one of the plurality of distinct signals to assist in identifying the touch event.

8. The apparatus of claim 1, wherein the signal processing system is further adapted to determine a phase shift of at least one of the plurality of distinct signals to assist in identifying the touch event.

9. A method comprising the steps of:
generating a plurality of distinct signals on at least a first group of a plurality of antennas during a plurality of sequential integration periods, wherein the plurality of sequential integration periods are frame-phase synchronized;

taking a sequence of digital samples of signals received on each of at least a second antenna group of the plurality of antennas during the plurality of sequential integration periods;

performing a discrete Fourier transform on each sequence of digital samples taken during each of the plurality of sequential integration periods;

determining a phase angle corresponding to each of the plurality of distinct signals in each sequence of digital samples for each of the plurality of sequential integration periods; and utilizing the phase angle of at least one of the plurality of distinct signals to identify a touch event, wherein the phase angle is used to form a heatmap.

10. The method of claim 9, wherein a phase relationship of at least one of the plurality of sequential integration period's phase angle is known with respect to another one of the plurality of sequential integration period's phase angle.

11. The method of claim 10, wherein the phase relationship is determined by subtracting a known phase variation.

12. The method of claim 10, wherein the phase relationship is determined by having the signal generator use a known starting phase angle.

13. The method of claim 9, wherein only integration periods having a known phase angle are used.

14. The method of claim 9, wherein the discrete Fourier transform is a Fast Fourier transform.

15. The method of claim 9, further comprising a step of determining a magnitude of at least one of the plurality of distinct signals to assist in identifying the touch event.

16. The method of claim 9, further comprising a step of determining a phase shift of at least one of the plurality of distinct signals to assist in identifying the touch event.

* * * * *